United States Patent [19]

Melberg et al.

[11] 4,184,201
[45] Jan. 15, 1980

[54] INTEGRATING PROCESSOR ELEMENT

[75] Inventors: Robert A. Melberg, Bloomington; Richard J. Wagner, West St. Paul, both of Minn.

[73] Assignee: Sperry Rand Corporation, New York, N.Y.

[21] Appl. No.: 899,909

[22] Filed: Apr. 26, 1978

[51] Int. Cl.² .............................................. G06F 1/00
[52] U.S. Cl. ................................................ 364/200
[58] Field of Search ... 364/200 MS File, 900 MS File

[56] References Cited

U.S. PATENT DOCUMENTS

| | | | |
|---|---|---|---|
| 3,609,697 | 9/1971 | Blevins | 364/200 |
| 4,031,517 | 6/1977 | Hirtle | 364/200 |
| 4,034,339 | 7/1977 | Free et al. | 364/900 |

Primary Examiner—Gareth D. Shaw
Assistant Examiner—C. T. Bartz
Attorney, Agent, or Firm—John L. Rooney; Kenneth T. Grace; Marshall M. Truex

[57] ABSTRACT

An integrating processor element containing a data processor that provides a computer with those functions normally associated with the Central Processor Unit (CPU) but which possesses architectural features to prevent compromise (i.e., unauthorized dissemination) of data in a multi-level secure environment. The data processor executes instructions from an internal instruction memory which cannot be altered by the data processor and cannot be accessed by the I/O processor (i.e., I/O controller). The instruction memory is segmented providing a separate segment for each discrete level of secure data to be processed. Each computer program is stored in the segment corresponding to the highest level of security of the data it will use. A second memory, called the hand-off memory, is a read/write memory accessible by the I/O processor as well as the data processor. The hand-off memory is also segmented by security level. A computer program may only write in the hand-off memory in the segment corresponding to the same security level as the segment in the instruction memory in which it is stored. A computer program may read, however, from any segment corresponding to the same or a lower security level. The data processor contains a security register which provides the hardware assurance that a computer program can access only permitted data. A memory address translator within the data processor is provided to permit relocation of segments within the hand-off memory without corresponding changes to any computer program. This feature enables generation of computer programs having lower classifications than the data upon which they operate.

5 Claims, 7 Drawing Figures

INTEGRATING PROCESSOR ELEMENT

GOVERNMENT CONTRACT

The invention herein described was made in the course of or under a contract or subcontract thereunder, with the United States Department of the Air Force.

BACKGROUND OF THE INVENTION

This invention relates to data processing systems and more specifically to an architecture to prevent compromise (i.e., unauthorized dissemination) of data in a multi-level secure environment.

The efficiencies attendant to sharing hardware resources and the communication requirements of large systems dictate the need to handle data of multiple security levels within the same data processing system. Department of Defense Directive Number 5200.28, Dec. 18, 1972, provides an overall statement of Defense Department Policy regarding security of data within data processing systems. Section VI provides the minimum requirements. The normal method of preventing compromise of data in an environment containing multiple security levels is to produce a computer containing CPU(s) that are separated into one or more executive or control states and one or more task or worker states. Execution in a task state prohibits the use of certain computer instructions and bounds memory access to previously defined limits in terms of types of access (i.e., read, write, instruction, execution, etc.) and areas of access (i.e., which addressable locations). Many CPU's have been designed which can prohibit compromise of data from one task state computer program to another. The applications software or computer programs that perform most of the data processing system functions are executed in task states.

Control software is needed, however, to perform those housekeeping and administrative chores associated with resource sharing and with enforcement of task state limitations. This control software is normally called an executive program. The executive program, by virtue of executing in one or more executive states, can execute those instructions not permitted in the task state and is not precluded, by hardware, from accessing any data within the CPU's memory. These capabilities are required by the executive program to enable it to perform its functions, but they also provide the capability of the executive program to compromise secure data. Therefore, such systems normally require the executive program to maintain a security level and degree of protection at least equal to that of the highest security level and of the highest degree of protection of any data in the system. Furthermore, unauthorized modifications of only the executive program can cause compromise of the entire data base of the system.

The present invention provides an alternative architecture that separates the data protection functions from the other executive functions and imbeds those data protection functions into hardware. The result is a data processing system whose data base can not be comprised unless both software and hardware are modified (i.e., in an unauthorized way).

SUMMARY OF THE INVENTION

The present invention provides a computer architecture wherein a hand-off memory is the only read/write memory within the computer. The hand-off memory provides the means whereby data is communicated between the data processor and the I/O processor. The data processor performs the normal data manipulation and arithmetic functions, as well as, communicating directly to local (i.e., physically adjacent) I/O devices. The I/O processor handles the protocol and interface computations required for remote (i.e., not physically adjacent) I/O devices. An instruction memory is internal to the data processor and is not alterable by it. The instruction memory is not accessible by the I/O processor.

The hand-off memory is characterized by its segmentation into areas directly corresponding to the various discrete security levels of the data to be stored and manipulated by the computer. The instruction memory within the data processor is similarly segmented. The data stored within a given segment of the hand-off memory is considered to be of the security level corresponding to that segment. The computer programs stored in a given segment of the instruction memory need not be considered of the security level corresponding to that segment. However, a computer program stored in a given segment may only store into the hand-off memory segment corresponding to the same security level as the instruction memory segment in which it is stored and may only read from hand-off memory segments corresponding to that same or a lower security level.

The special hardware within the data processor which protects the data within the hand-off memory from compromise includes the security register and the memory address translator. The security register is loaded under software control with a segment level identifier. With each access to the instruction memory, the address of the instruction to be accessed is transferred to the security register which determines from that address the segment of the instruction memory containing that address. The security register compares that segment with the software generated segment level identifier. If a match is found, the security register transfers a secure system signal to the memory address translator. If a mismatch is found, a secure system signal is transferred to the memory address translator permitting no further accesses to the hand-off memory by the data processor until an access enable is received. The finding of a mismatch also causes the security register to transfer a clear software addressable register signal to the programmable processing element thereby prohibiting compromise of data stored in software addressable registers. Notice that this process regularly occurs during the transition from execution of one computer program stored within a given instruction memory segment to execution of another computer program stored within a different instruction memory segment.

DESCRIPTION OF THE PREFERRED EMBODIMENTS

The present invention combines a number of functionally complex prior art elements into a unique architecture. No attempt is made herein to describe all of those elements in detail as much of that information is widely known. Detailed descriptions are provided, however, when necessary to properly practice the invention.

Figure 1:
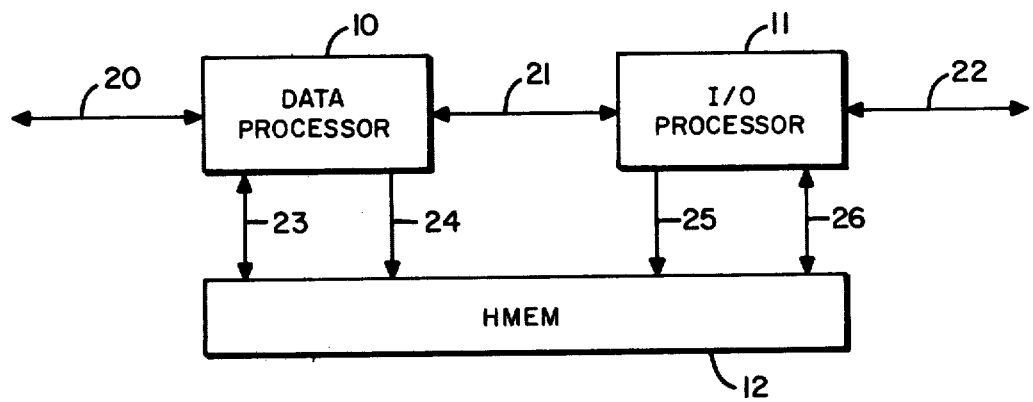
FIG. 1 shows the overall configuration of a computer employing the present invention.

The overall computer is shown in FIG. 1. I/O processor 11 provides the interface to remote I/O devices via line 22 which represents one or more communication channels. I/O processor 11 may access the hand-off memory, HMEM 12, by transferring an address and a read or write request via line 25. The data path is represented by line 26 which conducts data to and from HMEM 12. I/O Processor 11 receives I/O commands from Data Processor 10 via line 21 and returns status information. The interface via line 21 communicates only control and status information. The actual I/O data is communicated between data processor 10 and I/O processor 11 via HMEM 12. Data processor 10 performs those functions commonly thought of as being provided by a Central Processing Unit (CPU). These include data manipulation and arithmetic and logical functions. Data processor 10 interfaces to HMEM 12 via lines 23 and 24. The read or write access request along with the request address is transferred via line 24. The data is transferred to and from HMEM 12 via line 23. Line 20 provides a bi-directional path between data processor 10 and local (i.e., physically adjacent) I/O devices. This basic architecture is common to many existing computers and is quite familiar to those skilled in the art. Notice that data word and address word sizes are not provided because it can be anticipated that this basic architecture is applicable to machines with data word widths of 8-64 bits and address word widths of 12-30 bits using presently available technologies.

Figure 2:
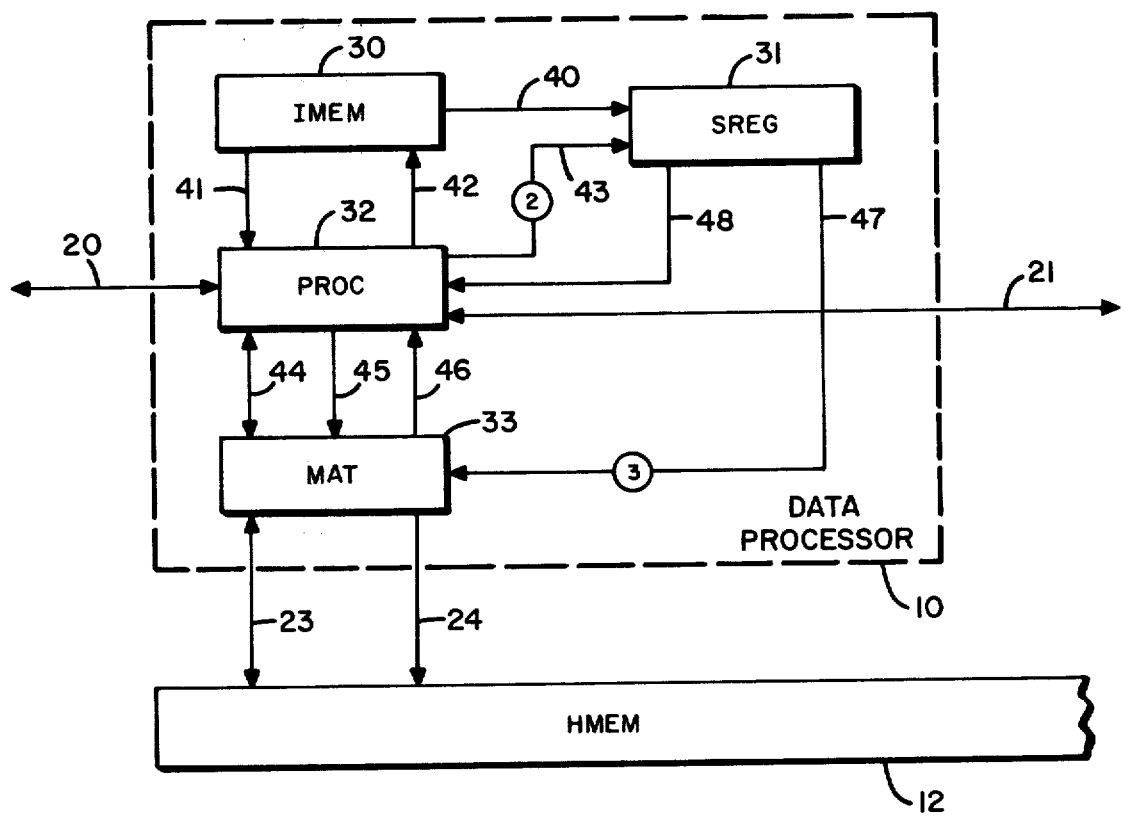
FIG. 2 shows the major elements of the data processor.
Figure 3A:
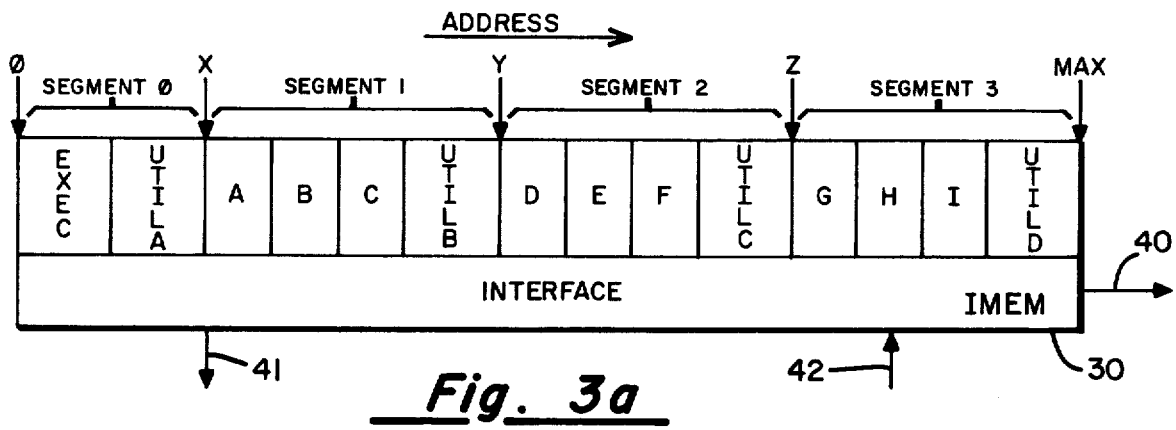
FIG. 3a illustrates the segmentation of the instruction memory.

FIG. 2 provides a more detailed view of data processor 10. The major elements are the instruction memory, IMEM 30, the security register, SREG 31, the programmable processing element, PROC 32, and the memory address translator, MAT 33. PROC 32 contains all of the arithmetic and logical capabilities normally associated with a Central Processing Unit (CPU). Except for those specific features described herein required to practice the present invention, PROC 32 may be considered equivalent to any CPU of ordinary design. It is preferrable, however, that the CPU chosen for PROC 32 have a microprogrammed architecture (i.e., the control structure uses a microprogrammable microprocessor) as this greatly facilitates the addition of the required features. The use of CPU's having microprogrammed architectures is now common in the art. PROC 32 requests instructions from IMEM 30 by transferring an instruction address and a request control signal via line 42. IMEM 30 honors the request by accessing the addressable location specified by the instruction address and transfers its contents to PROC 32 via line 41. FIG. 3a shows the organization of IMEM 30. Four discrete segments are shown corresponding to four discrete levels of secure data to be handled. IMEM 30 may be a single contiguous memory wherein the segments are defined by address limits only. This method of segmentation is preferred as being least expensive. However, physically separate memory elements may be used to provide the segmentation, if maximum physical and electrical isolation are desired. IMEM 30 must not be alterable by data processor 10. Therefore, IMEM 30 may be assembled using currently available read-only-memory (ROM) or programmable read-only-memory (PROM) devices as in the preferred embodiment. An alternative is to assemble IMEM 30 as a random access memory (RAM) having read/write characteristics but provide data processor 10 with no interface capable of writing into IMEM 30. Table A shows the relationship of the addresses to the segments for a single contiguous memory containing four segments. Notice that each segment contains its own utility programs (i.e., UTILA, UTILB, UTILC and UTILD) which are shared by the computer programs within that segment (e.g., programs A, B and C use UTILB). The segmentation defined is for hardware control purposes only and is in addition to any segmentation inherent in PROC 32 which may be used for software purposes (i.e., software controlled memory protection).

Upon being initiated for execution, each computer program stored within IMEM 30 executes a special instruction which transfers a segment level identifier to SREG 31 via line 43. See FIG. 2. The addition of this special instruction is one of the two modifications to the prior art PROC 32. As stated above, PROC 32 is preferably a microprogrammed device. Therefore, the addition of this special instruction is implemented as a change to the firmware (i.e., microprogram) of PROC 32. Motorola Semiconductor Products, Inc., Microprocessor Applications Manual, 1975, at Chapter 2, teaches microprogramming techniques for a typical microprocessor (i.e., Motorola MC6800). The special instruction for loading SREG 31 with a two-bit segment level identifier via line 43 is required by software development procedures to be placed for execution at the beginning (i.e., first instruction) of each computer program. This segment level identifier is a two-bit quantity used to identify the segment of IMEM 30 in which that computer program should be stored and hence the segment of HMEM 12 containing the highest level of secure data to be accessed by that computer program.

TABLE A

| SEGMENT | ADDRESS LIMITS | | COMPUTER PROGRAMS |
|---|---|---|---|
| 0 | 0 | X - 1 | Exec, UTILA |
| 1 | X | Y - 1 | A, B, C, UTILB |
| 2 | Y | Z - 1 | D, E, F, UTILC |
| 3 | Z | MAX - 1 | G, H, I, UTILD |

It is apparent, however, that the present invention applies to memories having more segments requiring segment level identifiers of more than two bits. As each instruction request is received by IMEM 30, it transfers the instruction request address to SREG 31 via line 40. SREG 31 utilizes the segment level identifier received via line 43 and the instruction request address received via line 40 to determine whether each instruction access request is within the assigned segment.

Figure 3B:
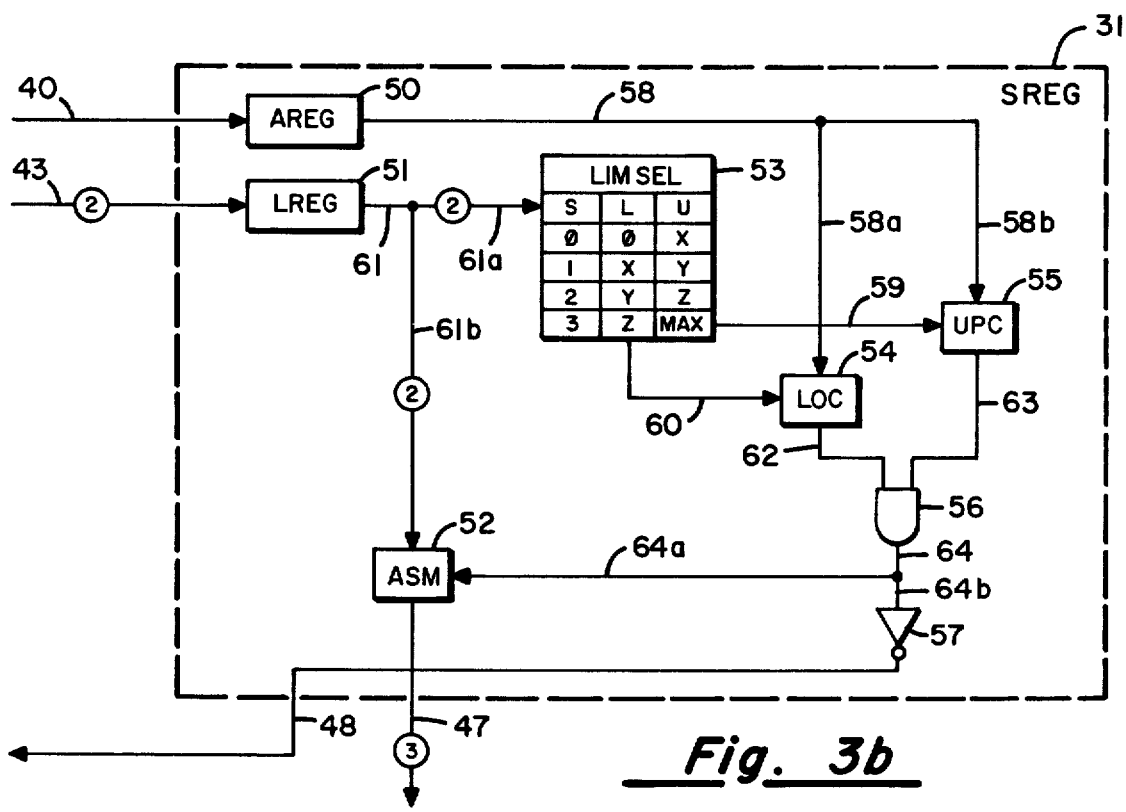
FIG. 3b provides a detailed representation of the security register.

FIG. 3b shows SREG 31 in more detail. The two-bit segment level identifier is received via line 43 and is stored in the level register, LREG 51, which must store the segment level identifier until again loaded at the initiation of execution of another of the computer programs stored within IMEM 30. The contents of LREG 51 is transferred via line 61. Line 61a transfers the segment level identifier to the limit selector, LIMSEL 53, for selection of the address limits within IMEM 30 corresponding to the segment level identifier. The preferred implementation for LIMSEL 53 is through use of a ROM of four addressable locations (i.e., one location corresponding to each possible value of the two-bit segment level identifier). Each of the four addressable locations contains a sufficient number of bits to store an ordered pair of addresses (each address uniquely identifies one addressable location within IMEM 30). Each ordered pair of addresses defines the lower and upper address limits of the segment of IMEM 30 corresponding to the segment level identifier used to address that ordered pair of addresses. The address limits of all segments of IMEM 30 are thus stored within LIMSEL 53. The segment level identifier (S) addresses one addressable location of LIMSEL 53 wherein one ordered pair of addresses is stored. One address of the ordered pair is the lower address limit (L) and the other address is the upper address limit (U). The lower address limit is transferred to the lower comparator, LOC 54, via line 60, and the upper address limit is transferred to the upper comparator, UPC 55, via line 59.

As stated above, IMEM 30 transfers to SREG 31, via line 40, each instruction request address which IMEM 30 receives from PROC 32. The instruction request address is received by AREG 50 from line 40. AREG 50 stores the instruction request address until loaded by receipt of the next instruction request address. Line 58a transfers the instruction request address to LOC 54 and line 58b transfers the instruction request address to UPC 55. LOC 54 compares the lower address limit received from LIMSEL 53 via line 60 with the instruction request address. If the comparison indicates that the instruction request address is greater than or equal to the lower address limit, LOC 54 sets line 62 true. If the comparison indicates that the instruction request address is less than the lower address limit, LOC 54 sets line 62 false. Similarly, UPC 55 compares the upper address limit received from LIMSEL 53 via line 59 with the instruction request address. If the comparison indicates that the instruction request address is less than the upper address limit, UPC 55 sets line 63 true. If the comparison Indicates that the instruction request address is greater than or equal to the upper address limit, UPC 55 sets line 63 false.

AND gate 56 sets line 64 true, if and only if, both line 62 and line 63 are true. AND gate 56 sets line 64 false if either or both of lines 62 and 63 are false. Line 64 true is called the secure system signal. Inverter 57 sets line 48 true if line 64b is false and sets line 48 false if line 64b is true. Line 48 true is a clear software addressable register signal. Referring to FIG. 2, line 48 transfers a clear software addressable register signal to PROC 32 where it is utilized. The clear software addressable register signal probibits compromise of data which may reside in software addressable registers when PROC 32 transitions from execution of a computer program stored in one segment of IMEM 30 to execution of another computer program stored in a different segment of IMEM 30. The clear software addressable register signal is received by PROC 32 as an interrupt to the microprogram. The firmware response to that interrupt is a clearing of each register directly addressable by software (i.e., register whose contents may be used by instructions from IMEM 30 as data for computations). The clear software addressable register signal may, of course, be generated as a result of an attempted security violation. Most often, however, it will occur as a result of normal computer program operation as PROC 32 executes computer programs from different segments of IMEM 30. Notice further that the operation of SREG 31 is not intended to perform all of the functions of memory protection, since individual computer programs are not partitioned (i.e., segments are protected, not computer programs, and each segment may contain many computer programs) and SREG 31 does not aid in retaining software control of PROC 32 but only protects data from compromise.

As seen in FIG. 3b, the segment level identifier is transferred to assembly point, ASM 52 via line 61b. Line 64a transfers the state of line 64 to ASM 52. ASM 52 combines the two bits of the segment level identifier with the secure system signal or the $\overline{\text{secure system signal}}$ and transfers this three bit quantity to MAT 33 via line 47. See also FIG. 2. PROC 32 makes all operand references to HMEM 12 via MAT 33, as is shown in FIG. 2. A read or write request, along with the operand request address, is transferred to MAT 33 via line 45. Should MAT 33 determine that the access is permitted, it transfers the read or write request, along with the operand request address, to HMEM 12 via line 24. If the request is a write request, the data word is transferred from PROC 32 to MAT 33 via line 44 and from MAT 33 to HMEM 12 via line 23. If the data request is a read request, the data word is transferred via line 23 from HMEM 12 to MAT 33 and via line 44 from MAT 33 to PROC 32. If MAT 33 determines that the request from PROC 32 is illegal, no request is forwarded to HMEM 12 via line 24 and PROC 32 is notified by an illegal reference interrupt signal transferred via line 46.

Figure 3C:
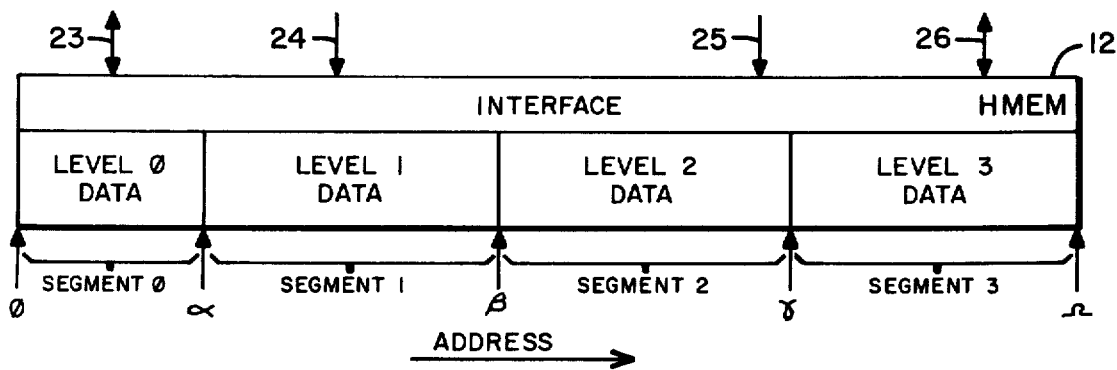
FIG. 3c illustrates the segmentation of the hand-off memory.

HMEM 12 may be segmented in the same fashion as IMEM 30. As with IMEM 30, HMEM 12 may have separate memory elements for each segment or may be a single memory element with segments delimited by address. Because the data to be stored within HMEM 12 is to be considered of the security level corresponding to the segment in which it is stored, it may be more desirable from HMEM 12 to have separate segments than for IMEM 30. Because of cost limitations, however, it is preferrable to have HMEM 12 segmented by address limits only, if possible. FIG. 3c shows HMEM 12 wherein the segmentation is accomplished by address limits. Table B shows the relationship of the segments to the address limits for a four segment HMEM 12.

Figure 4:
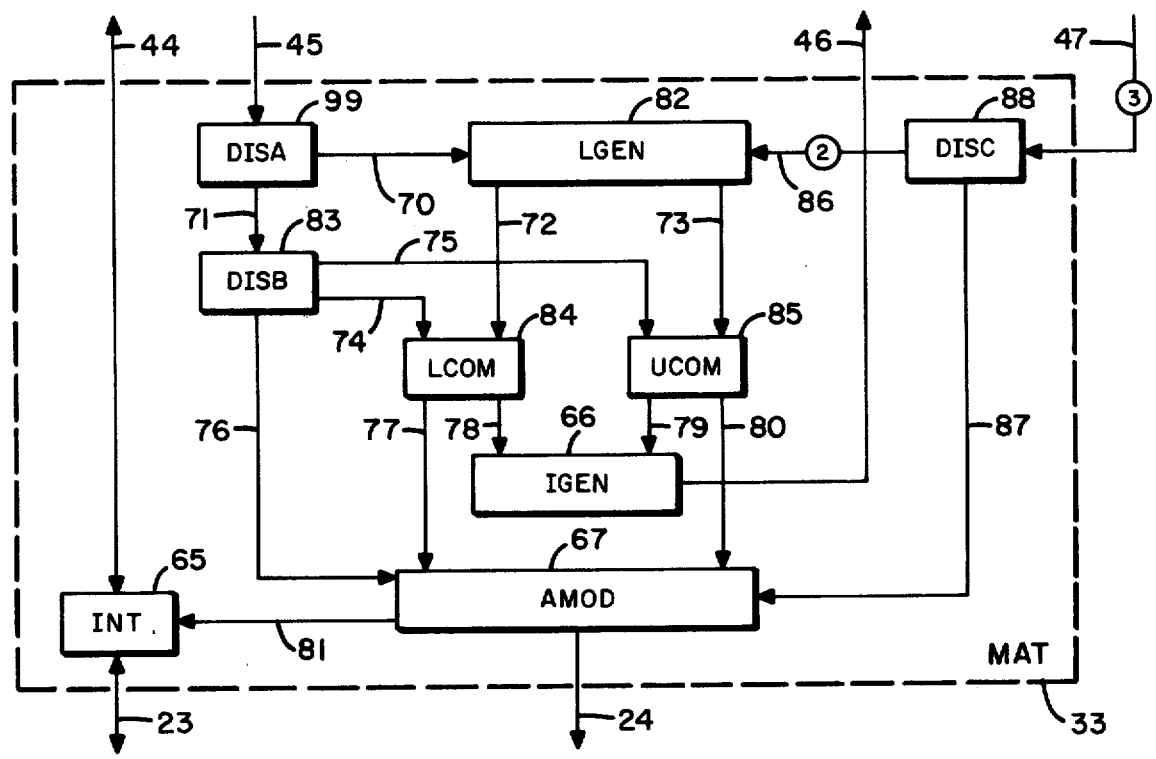
FIG. 4 provides a detailed view of the memory address translator.

FIG. 4 presents MAT 33 in more detail. The bi-directional data interface is shown as being buffered by the interface buffer register, INT 65, which receives a data word from PROC 32 via line 44 and transfers it via line 23 to HMEM 12 on a write access.

TABLE B

| SEGMENT | ADDRESS LIMITS | DATA |
|---|---|---|
| 0 | 0 → α - 1 | Level 0 |
| 1 | α → β - 1 | Level 1 |
| 2 | β → γ - 1 | Level 2 |
| 3 | γ → Ω - 1 | Level 3 |

For read accesses, INT 65 receives a data word from HMEM 12 via line 23 and transfers it to PROC 32 via line 44. INT 65 is a common element to those skilled in the art with its only unique feature being the read/write enable signal received via line 81. This signal will be discussed later.

Disassembler, DISC 88, receives the segment level identifier of two bits and the secure system signal or secure system signal via line 47 and transfers the segment level identifier to the limit generator, LGEN 82, via line 86 and the secure system signal or secure system signal to the address modifier, AMOD 67, via line 87. Disassembler, DISA 99, receives the read or write request along with the operand request address from PROC 32 via line 45. DISA 99 transfers only the read or write request to LGEN 82 via line 70 and transfers both the read or write request and the operand request address to disassembler DISB 83, via line 71. LGEN 82 utilizes the segment level identifier received via line 86 and the read or write request received via line 70 to determine the address limits permitted for the operand access request being processed. LGEN 82 functions much as LIMSEL 53 explained above. As with LIMSEL 53, it is preferrable to implement LGEN 82 using a ROM. LGEN 82 must contain eight rather than four addressable locations, however, as the lower limit will vary depending upon whether a read or write request is present. Each of the eight addressable locations contains an ordered pair of addresses corresponding to the lower and upper limits of one segment of HMEM 42. One of the eight addressable locations is selected by the corresponding segment level identifier and the read or write request. Table C provides the address limits generated by LGEN 82 for each combination of segment level identier and read or write request for HMEM 12 segmented as in FIG. 3c.

TABLE C

| SEGMENT LEVEL IDENTIFIER | READ OR WRITE ACCESS | LOWER LIMIT | UPPER LIMIT |
|---|---|---|---|
| 0 | READ | 0 | $\alpha$ |
| 0 | WRITE | 0 | $\alpha$ |
| 1 | READ | 0 | $\beta$ |
| 1 | WRITE | $\alpha$ | $\beta$ |
| 2 | READ | 0 | $\gamma$ |
| 2 | WRITE | $\beta$ | $\gamma$ |
| 3 | READ | 0 | $\Omega$ |
| 3 | WRITE | $\gamma$ | $\Omega$ |

Referring to FIG. 4, LGEN 82 transfers the lower limit to the lower limit comparator, LCOM 84, via line 72, and transfers the upper limit to the upper limit comparator, UCOM 85, via line 73. DISA 81 transfers the operand request address and the read or write request to disassembler DISB 83 via line 71. DISB 83 transfers only the operand request address to LCOM 84 via line 74 and to UCOM 85 via line 75. DISB 83 transfers the operand request address and the read or write request to the address modifier, AMOD 67 via line 76.

LCOM 84 receives the operand request address via line 74 and the lower limit via line 72 and compares these two quantities. If the operand request address is greater than or equal to the lower limit, LCOM 84 sets line 77 true and line 78 false. If the operand request address is less than the lower limit, LCOM 84 sets line 77 false and line 78 true. Similarly, UCOM 85 receives the operand request address via line 75 and the upper limit via line 73 and compares these two quantities. If the operand request address is less than the upper limit address, UCOM 85 sets line 80 true and line 79 false. If the operand request address is greater than or equal to the upper limit address, UCOM 85 sets line 80 false and line 79 true.

The interrupt generator, IGEN 66, senses the state of lines 78 and 79. If either line 78 or 79 (or both) is set true, IGEN 66 generates an illegal reference interrupt signal which is transferred via line 46 to PROC 32. See also FIG. 2. If both line 78 and line 79 are set false, IGEN 66 generates no illegal reference interrupt signal. The illegal reference interrupt signal, if generated, notifies PROC 32 that access to the operand request address is not permitted for the segment of IMEM 30 which contains the computer program currently being executed. The use of such error interrupts is considered quite common with present day data processors.

Figure 5:
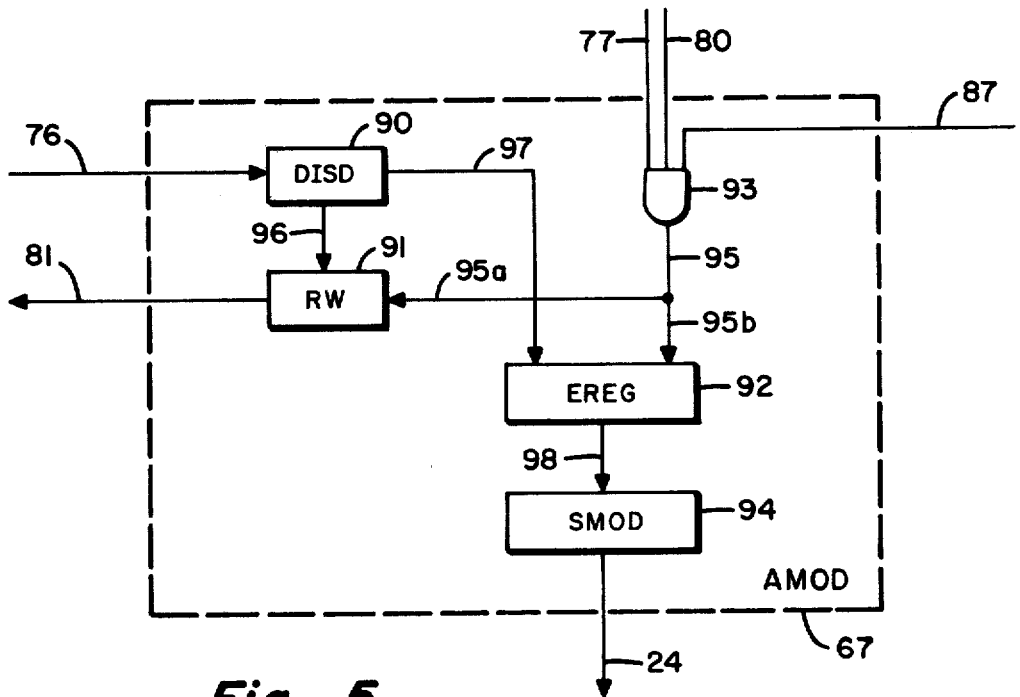
FIG. 5 illustrates the address modifier.

AMOD 67 receives the secure system signal or secure system signal via line 87 and the read or write request and the operand request address via line 76. Based upon these signals and the states of line 77 and 80, AMOD 67 determines whether or not to provide a read/write enable signal to INT 65 via line 81 and whether to forward the read or write request and operand request address to HMEM 12 via line 24. FIG. 5 provides a more detailed view of AMOD 67. The read or write request and operand request address are received by disassembler DISD 90, via line 76. DISD 90 transfers only the read or write request to the read/write enable, RW 91, via line 96. DISD 90 transfers both the read or write request and the operand request address to the enable register, EREG 92, via line 97. AND gate 93 senses the states of lines 77 and 80, as well as the presence of a secure system signal or secure system signal via line 87. If line 77 is true and line 80 is true and a secure system signal is present via line 87, AND gate 93 sets line 95 true. If line 77 is false and/or line 80 is false and/or the secure system signal is present via line 87, AND gate 93 sets line 95 false.

RW 91 receives the read or write request from DISD 90 via line 96. RW 91 also senses the state of line 95 via line 95a. If line 95a is true, RW 91 will generate a read/write enable to be transmitted to INT 65 via line 81. If line 95a is false, RW 91 will not generate a read/write enable. The read/write enable, if generated, will be a read data enable if a read request is received from DISD 90 via line 96. The data enable, if generated, will be a write data enable if a write request is received from DISD 90 via line 96. By referring to FIG. 4, a read data enable received via line 81 causes INT 65 to gate the data word from line 23 to line 44. A write data enable received via line 81 causes INT 65 to gate the data word from line 44 to line 23.

Referring to FIG. 5, EREG 92 receives the read or write request and the operand request address from DISD 90 via line 97. EREG 92 senses the state of line 95 via line 95b. If line 95b is true, EREG 92 transfers the read or write request and the operand request address to the security modifier, SMOD 94, via line 98. If line 95b is false, EREG 92 does not transfer the read or write request or the operand request address. SMOD 94 is shown in FIG. 5 to illustrate the optional use of an address scrambler. In transferring the operand request address received from EREG 92 via line 98 to HMEM 12 via line 24, SMOD 94 can scramble or modify the operand request address in some predefined way to prevent the computer programs being executed by PROC 32 from knowing the exact physical location or interrelationship of data stored within HMEM 12. The presence of SMOD 94 is not necessary to the present invention so its operational details are not fully discussed here.

As can be seen by those skilled in the art, the present invention is applicable to a wide variety of computers having a substantial range of capacities of instruction memory, programmable processing element, hand-off memory, and number of levels of secure data (i.e., number of segments of instruction and hand-off memories).

What is claimed is:

1. A computer comprising:
   a segmented read/write memory having a separate segment corresponding to each discrete level of secure data to be processed;
   an I/O processor having access to said segmented read/write memory;
   a segmented instruction memory unalterable by said computer having a separate segment corresponding to each discrete level of secure data to be processed;
   a programmable processor element having an interface to said I/O processor only for the exchange of command and status signals; and
   means responsively coupled to said segmented instruction memory, said segmented read/write memory and said programmable processor element for restricting the access of said programmable processor element to writing in only said separate segment of said segmented read/write memory corresponding to said discrete level of secure data being processed and to reading from only said separate segments of said segmented read/write memory corresponding to said discrete level of secure data being processed or lower levels.

2. A computer according to claim 1 wherein said restricting means further comprises:
   a security register which maintains an indication of the level of security of data being processed wherein said indication requires a correlation of software and hardware inputs; and
   a memory address translator which compares said indication with each request to access said segmented read/write memory to determine whether said request to ccess refers to said separate segments of said segmented read/write memory permitted for said discrete level of secure data being processed.

3. A computer comprising:
   a segmented read/write memory having a separate segment corresponding to each discrete level of secure data to be processed;
   an I/O processor coupled to said segmented rad/write memory permitting said I/O processor to read data from and write data into addressable locations of said segmented read/write memory at addressable locations specified by said I/O processor;
   a programmable processor element coupled to said segmented read/write memory permitting said programmable processor element to read data from and write data into addressable locations of said segmented read/write memory at addressable locations specified by said programmable processor element and coupled to said I/O processor only for the exchange of command and status signals;
   a segmented instruction memory having a separate segment corresponding to each discrete level of secure data to be processed coupled to said programmable processor element permitting said programmable processor element to only read instructions from addressable locations of said segmented instruction memory at addressable locations specified by said programmable processor element;
   a security register coupled to said programmable processor element permitting said security register to be loaded via software with a code representing the level of secure data being processed and coupled to said segmented instruction memory to determine whether said programmable processor element is executing instructions from said segment of said segmented instruction memory corresponding to said code representing said level of secure data being processed; and
   a memory address translator coupled to said programmable processor element and said segmented read/write memory, to read data from and write data into addressable locations of said segmented read/write memory at said addressable locations specified by said programmable processor element if and only if said security register has determined that said programmable processor element is executing instructions from the segment of said segmented instruction memory corresponding to said code representing said level of secure data being processed and to permit said programmable processor element to only write data into said segmented read/write memory at said addressable locations within said segment corresponding to said level of secure data corresponding to said segment of said segmented instruction memory containing said instructions being executed by said programmable processor element and to permit said programmable processor element to only read data from said segmented read/write memory at said addressable locations within said segment corresponding to said level of secure data or to a lower level corresponding to said segment of said segmented instruction memory containing said instruction being executed by said programmable processor element.

4. A computer for processing ordered multiple levels of secure data comprising:
   a read/write memory having a plurality of addressable locations wherein each of said plurality of addressable locations is addressed by a different data address and having a plurality of segments wherein each of said plurality of segments contains a different portion of said plurality of addressable locations and wherein each of said segments corresponds to a different one of said ordered multiple security levels;
   an instruction memory unalterable by said computer having a plurality of addressable locations wherein each addressable location contains a one of a series of computer instructions and wherein each addressable location is addressed by a different instruction address and having a plurality of segments wherein each of said plurality of segments contains a different portion of said plurality of addressable locations and wherein each of said segments corresponds to a different one of said ordered multiple security levels;
   a programmable processor element coupled to said read/write memory and said instruction memory which is programmable through the execution of said series of computer instructions wherein a one of said series of computer instructions currently scheduled for execution is addressed by said programmable processor element using said different instruction address corresponding to a one of said plurality of addressable locations of said instruction memory and which may read from and write into said read/write memory under control of said one of said series of computer instructions currently scheduled for execution using said different data address corresponding to a one of said plurality of addressable locations of said read/write memory;

means responsively coupled to said instruction memory, said read/write memory, and said programmable processor element for prohibiting said programmable processor element from writing into said read/write memory whenever said one of said series of computer instructions currently scheduled for execution is addressed by said programmable processor element using said different instruction address corresponding to said one of said plurality of addressable locations of said instruction memory contained within a one of said plurality of segments corresponds to said different one of said ordered multiple security levels which is not the same as said different one of said ordered multiple security levels corresponding to a one of said plurality of segments within said read/write memory containing said different portion of said addressable locations containing a one of said addressable locations corresponding to said different data address used by said programmable processor element and for prohibiting said programmable processor element from reading from said read/write memory whenever said one of said series of computer instructions currently scheduled for execution is addressed by said programmable processor element using said different instruction address corresponding to said one of said plurality of addressable locations of said instruction memory contained within a one of said plurality of segments corresponds to said different one of said ordered multiple security levels which is lower than said different one of said ordered multiple security levels corresponding to said one of said plurality of segments within said read/write memory containing said different portion of said addressable locations containing said one of said addressable locations corresponding to said different data address used by said programmable processor element.

5. A computer for processing ordered multiple levels of secure data comprising:

a segmented read/write memory having a plurality of segments wherein each of said segments corresponds to a different one of said multiple levels of secure data to be processed and wherein each of said segments has a plurality of addressable locations and each of said plurality of addressable locations of each of said segments has a different data address corresponding to a different one of said plurality of said addressable locations within a different one of said plurality of segments;

a segmented instruction memory having contents which are not alterable by said computer containing a series of computer instructions and having a plurality of segments wherein each of said plurality of segments corresponds to a different one of said ordered multiple levels of secure data to be processed and wherein each of said segments has a plurality of addressable locations and each of said plurality of addressable locations of each of said segments has a different instruction address corresponding to a different one of said plurality of said addressable locations within a different one of said plurality of segments;

a programmable processor element coupled to said segmented instruction memory and to said segmented read/write memory which is programmable through the execution of said series of computer instructions contained within said segmented instruction memory wherein a one of said series of computer instructions currently scheduled for execution by said programmable processor element is addressed by said programmable processor element using said different instruction address corresponding to said different one of said plurality of addressable locations within said different one of said plurality of segments within said segmented instruction memory containing said one of said series of computer instruction currently scheduled for execution by said programmable processor element and which may read from or write into said different one of said plurality of said addressable locations within said different one of said plurality of segments of said segmented read/write memory by using said different data address corresponding to said different one of said plurality of said addressable locations within said different one of said plurality of segments within said segmented read/write memory and which may determine said different one of said ordered multiple levels of secure data to be processed by executing a unique one of said series of computer instructions and which has software addressable registers into which data may be written and from which data may be read by the execution of said series of computer instructions wherein said software addressable registers may be cleared to a predefined state through the application of a clear software addressable register signal;

security register means responsively coupled to said programmable processor element and said segmented instruction memory for transferring said clear software addressable register signal to said programmable processor element whenever said different instruction address used by said programmable processor element for addressing said one of said series of computer instructions currently scheduled for execution by said programmable processor element does not correspond to said different one of said plurality of addressable locations within said different one of said plurality of segments within said segmented instruction memory corresponding to said different one of said ordered multiple levels of secure data to be processed as determined by said programmable processor element; and memory address translator means responsively coupled to said programmable processor element, said segmented read/write memory, and said security register means for prohibiting said programmable processor element from writing into said different one of said plurality of said addressable locations within said different one of said plurality of segments of said segmented read/write memory whenever said different data address used by said programmable processor element does not correspond to said different one of said plurality of said addressable locations within said different one of said plurality of segments within said segmented read/write memory corresponding to said different one of said ordered multiple levels of secure data corresponding to said different one of said segments of said segmented instruction memory having said addressable location containing said one of said series of computer instructions currently scheduled for execution and said programmable processor element from reading from said different one of said plurality of said addressable locations within said different one of said plurality of segments of said segmented read/write memory whenever said different data address used by said programmable processor element corresponds to said different one of said plurality of said addressable locations within said different one of said plurality of segments within said segmented read/write memory corresponding to a higher one of said ordered multiple levels of secure data than said different one of said segments of said segmented instruction memory having said addressable location containing said one of said series of computer instructions currently scheduled for execution.

* * * * *

UNITED STATES PATENT AND TRADEMARK OFFICE
CERTIFICATE OF CORRECTION

PATENT NO. : 4,184,201
DATED : January 15, 1980
INVENTOR(S) : Robert A. Melberg, et al It is certified that error appears in the above-identified patent and that said Letters Patent are hereby corrected as shown below:

Column 9, Line 39, "ccess" should be -- access --.

Column 9, Line 47, "rad/-" should be -- read/- --.

Signed and Sealed this

Thirteenth Day of May 1980

[SEAL]

Attest:

Attesting Officer

SIDNEY A. DIAMOND

Commissioner of Patents and Trademarks